United States Patent [19]

Maxwell, Jr.

[11] 4,139,848
[45] Feb. 13, 1979

[54] AIRCRAFT PROXIMITY WARNING INDICATOR

[75] Inventor: Richard F. Maxwell, Jr., Catonsville, Md.

[73] Assignee: Westinghouse Electric Corp., Pittsburgh, Pa.

[21] Appl. No.: 697,100

[22] Filed: Jun. 17, 1976

[51] Int. Cl.² .......................... G01S 9/56; G01S 3/02
[52] U.S. Cl. .................... 343/6 ND; 343/6 R; 343/6.5 R; 343/112 CA; 343/6 TV
[58] Field of Search ............ 343/6 DF, 6 ND, 6 TV, 343/6 R, 6.5 R, 6.5 SS, 6.8 R, 5 PD, 112 CA, 113 R; 356/4, 5,

[56] References Cited

U.S. PATENT DOCUMENTS

| | | | |
|---|---|---|---|
| 2,943,201 | 6/1960 | Hicks, Jr. et al. | 343/112 CA |
| 3,108,270 | 10/1963 | Fairbanks | 343/6 R |
| 3,159,832 | 12/1964 | Cox, Jr. | 343/6.8 R |
| 3,179,933 | 4/1965 | Hahnel | 343/112 CA |
| 3,203,305 | 8/1965 | Fairbanks | 356/4 |
| 3,563,651 | 2/1971 | Alvarez et al. | 356/4 |
| 3,572,928 | 3/1971 | Decker, Jr. | 356/4 |
| 3,620,626 | 11/1971 | Daly | 356/4 |
| 3,652,784 | 3/1972 | Wupper et al. | 343/6 TV |
| 3,736,061 | 5/1973 | Knowlden et al. | 356/4 |
| 3,743,216 | 7/1973 | Salonimer | 244/3.16 |
| 3,754,249 | 8/1973 | Kearney | 343/6 TV |
| 4,015,258 | 3/1977 | Smith et al. | 343/6 R |

OTHER PUBLICATIONS

Richard Daly; "An Optical Radar Pilot Warning Indicator", Proceedings of the IEEE, vol. 58, No. 3 (Mar. 1970), pp. 456-461.

Primary Examiner—Maynard R. Wilbur
Assistant Examiner—Lawrence Goodwin
Attorney, Agent, or Firm—R. M. Trepp

[57] ABSTRACT

An aircraft proximity warning indicator incorporating an RF receiver, optical sensor, and display is described which may receive an RF signal followed by an optical radiation pulse from another aircraft where the received RF signal is used to control the optical sensor and display so that it senses and displays the optical radiation pulse.

2 Claims, 6 Drawing Figures

AIRCRAFT PROXIMITY WARNING INDICATOR

BACKGROUND OF THE INVENTION

1. Field of the Invention

This invention relates to aircraft collision avoidance systems, and more particularly, aircraft proximity warning systems utilizing both RF signals and optical radiation pulses.

2. Description of the Prior Art

In the prior art, an aircraft proximity warning indicator (PWI) on a protected aircraft utilized either a radio or optical signal from an intruder aircraft to provide an indication of its presence. One example of a radio signal system is where the protected aircraft interrogates transponders of intruder aircraft. A decodable reply from all intruder aircraft equipped with transponders provided the protected aircraft with the range of each intruder aircraft using the round trip signal transit time. The decodable reply may also contain other desirable information such as the barometric altitude of the intruder aircraft. In implementing an RF transponder system, relatively expensive equipment is required in all aircraft. Private aircraft, which present a significant collision threat to other aircraft in the air, for example commercial aircraft, may not be able to utilize the RF transponder systems because of the expense of the equipment.

A second relatively low cost approach for proximity warning is to detect optical signals from a standard xenon flashing beacon installed on an intruder aircraft by an electro-optical receiver in an aircraft to be protected. The use of such optical beacons is now widespread on private aircraft and could be used by all aircraft without serious economic hardship. Experiments have shown that optical beacons could be detected at satisfactory ranges of up to 10 miles by a simple detector and optics system. A standard aircraft flashing beacon flashes at a rate of about 30 per minute for a duration of 50 microseconds. A conventional receiver could provide detection of the optical beacon over a field of view of 360° azimuth and ± 45° elevation with angular resolution of 1° but would have to be a "staring" system rather than a gated or scanning system. In a "staring" system, the receiver is sensing optical radiation 100% of the time. A severe disadvantage of a "staring" system is that light from other sources is allowed to accumulate in the sensor between flashes of light from an optical beacon. The light from other sources may be for example streetlights, daylight, or reflections of sunlight. The light from other sources will appear as background noise in a "staring" system with the optical beacon flash being the desired signal. The optical receiver in a "staring" system will therefore have to operate with a lower signal to noise ratio since the background noise is accumulated 100% of the time. The present invention, by use of synchronization signal prior to an optical radiation pulse allows the sensor to activate during an optical radiation pulse and off at other times thereby providing a higher signal to noise ratio in the optical receiver.

SUMMARY OF THE INVENTION

In accordance with the present invention a method and means is provided for proximity warning of aircraft by receiving signals, generating a control signal in response to the signal, sensing an optical radiation pulse at a time in response to said control signal, and displaying said sensed optical radiation pulse. A first aircraft emits a signal to indicate to all other aircraft in the area of an impending optical pulse. A second aircraft protected by a proximity warning indicator receives the signal and the optical radiation through wide angle optics. A receiver generates a control signal to turn on an image intensifier tube at the appropriate time to sense the optical radiation. The optical radiation passes through the wide angle optics and the image intensifier tube to a TV camera which has an output coupled to a display.

DESCRIPTION OF THE PREFERRED EMBODIMENTS

Figure 1:
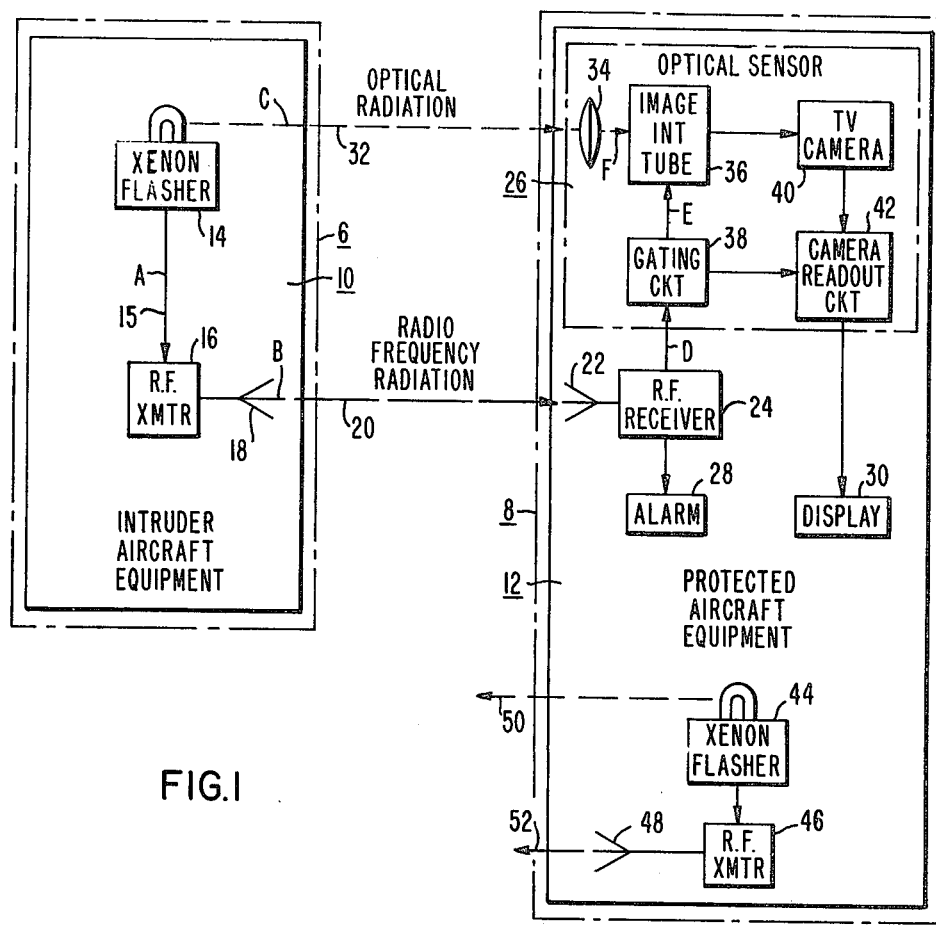
FIG. 1 is a schematic and block diagram of one embodiment of the invention including intruder aircraft equipment and protected aircraft equipment.

Referring to FIG. 1, the embodiment of an aircraft proximity warning indicator is shown for an intruder aircraft 6 and a protected aircraft 8. The intruder aircraft may be, for example, a private airplane and carries equipment 10 which functions to emit a signal and optical radiation 32 to allow a protected aircraft 8 to detect its presence in the area. Equipment 10 includes a source for optical radiation such as xenon flasher 14 coupled to a transmitter such as RF transmitter 16. The xenon flasher 14 functions to provide a signal A over line 15 to the RF transmitter 16 providing advanced signaling that an optical radiation pulse or a xenon flash is about to occur. The xenon flasher 14 provides an optical radiation pulse or a xenon flash, signal C, which may be detected by equipment 12 on the protected aircraft 8. The xenon flasher may, for example, be Model No. HR or Model No. STC No. SA 615EA manufactured by the Wehlen Company. Xenon flasher 14 may be substituted with other sources of optical radiation suitable for detection by equipment 12 in the protected aircraft 8. RF transmitter 16 is coupled to antenna 18. Antenna 18 functions to radiate RF or microwave energy 20 provided by RF transmitter 16 such as signal B which precedes the optical radiation signal C. The RF radiation 20, signal B, provides an advanced signal or synchronization to equipment 12 on the protected aircraft 8 that intruder aircraft equipment 10 is about to emit optical radiation in the form of signal C. An example of signals A, B, and C and their timing relationship is graphically shown in FIG. 4.

Protected aircraft equipment 12 receives the signal such as radio frequency radiation 20 with antenna 22 which functions to receive radio frequency radiation 20 from intruder aircraft 6 in the area. Antenna 22 is coupled to RF receiver 24 which functions to detect the received RF radiation 20. RF receiver 24 is coupled to optical sensor 26 to provide an indication such as signal D in FIG. 5 that an RF pulse 20 has been received. RF receiver 24 is also coupled to alarm 28 which provides an indication such as a buzzing sound or flashing light to the pilot or co-pilot that RF radiation 20 has been received whereupon the pilot or co-pilot may observe the display 30.

Optical radiation 32 from intruder aircraft equipment 10 is received by optical sensor 26 which is a portion of equipment 12 on the protected aircraft 8. Optical sensor 26 functions to receive the optical radiation 32 from an intruder aircraft equipment 10 or from other intruder aircraft in the area and to provide electrical output signals indicative of the received optical radiation 32 to display 30. Display 30 functions to display the optical radiation 32 in a form to indicate the azimuth and elevation of received optical radiation 32 such as with respect to the protected aircraft orientation or with respect to a geographic coordinate system. One purpose of display 30, for example, is to allow a pilot or co-pilot or other viewer to determine whether the protected aircraft is in danger of collision with the intruder aircraft by looking at the display 30.

Figure 5:
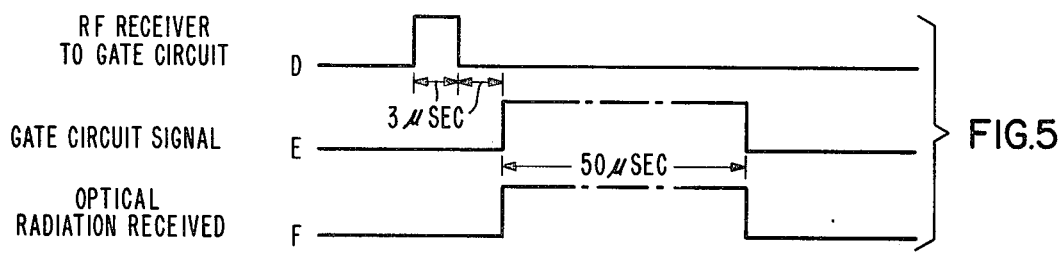

Optical sensor 26 as shown in FIG. 1, has wide angle optics 34 suitable for receiving optical radiation 32 and is coupled to image intensifier tube 36 which functions as an optical shutter for periods of time such as 50 microseconds under the control of a signal from gating circuit 38 which functions to provide a timing signal to image intensifier tube 36 such as signal E which is, for example, shown in FIG. 5. Wide angle optics 34 may, for example, be Model No. 6518 manufactured by the Javelin Company, where the lens each have an 120° field of view. The optical radiation coupled to image intensifier tube 36 may be represented as signal F which is shown, for example, in FIG. 5. Image intensifier tube 36 may for example be Model No. 30920 manufactured by the Westinghouse Electric Corporation. Image intensifier tube 36 is coupled to TV camera 40 which may for example be a vidicon such as Model No. 7735 manufactured by the General Electric Corporation. TV camera 40 which functions to convert optical radiation to electrical signals is coupled to camera readout circuitry 42 which functions to provide electrical signals in the proper format to display 30. Gating circuitry 38 is coupled to camera readout circuitry 42 to provide a timing pulse indicative that RF radiation 20 has been received and that optical radiation 32 has been received and should be displayed.

Optical sensor 26 is coupled to display 30 by means of camera readout circuitry 42. Display 30 may be a matrix of electro-luminescent diodes or light-emitting diodes or a cathode ray tube (CRT). The display may for example be a circular CRT with the azimuth of received optical radiation indicated by angular displacement around the circular display and where the elevation of received optical radiation may be indicated in the radial direction from the center of the circular display. The range of the received optical radiation 32 may be indicated by a graphical symbol on the display such as by a short line where the length of the line indicates the range magnitude.

Protected aircraft equipment 12 may also include a xenon flasher 44 coupled to RF transmitter 46 which in turn is coupled to antenna 48. Xenon flasher 44 and RF transmitter 46 and antenna 48 may operate independently of the other equipment of protected aircraft equipment 12 and function to provide a warning to other protected aircraft in the area of its presence. Xenon flasher 44 functions similar to xenon flasher 14. RF transmitter 46 and antenna 48 functions similar to RF transmitter 16 and antenna 18. Xenon flasher 44 emits optical radiation 50 which is preceded by an RF radiation signal 52.

Figure 2:
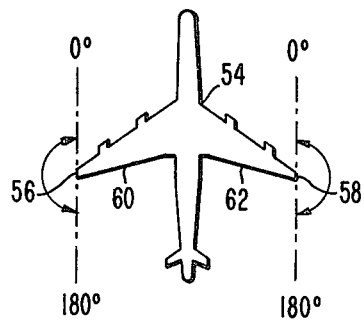
FIGS. 2 and 3 show an arrangement for attaching wide angle optics to a protected aircraft.

Referring now to FIG. 2, protected aircraft 54 is shown with wide angle optics 56 and 58 mounted on the extremities of wings 60 and 62, respectively. As shown in FIG. 2 each wide angle optic 56 and 58 provide 180° field of view coverage in azimuth from the forward direction of the airplane to the aft direction of the airplane.

Figure 3:
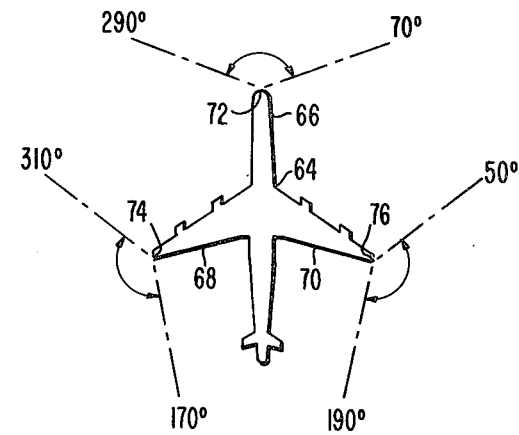

Referring to FIG. 3, an alternate arrangement is shown for the attachment of wide angle optics on aircraft 64. Aircraft 64 has a nose 66 and a left wing 68 and a right wing 70. Wide angle optics 72 is attached to nose 66 having a field of view of 140° centered in the forward direction from 290° to 70°. Wide angle optics 74 is shown attached to the end of wing 68 having a field of view of 140° from the aft direction of the airplane 170° towards a forward direction of approximately 310°. Wide angle optics 76 is shown at the end of wing 70 having a field of view of 140° from the aft direction of the airplane 190° to approximately 50° in the forward direction. As can be seen referring to FIG. 3, each set of wide optics has an unobstructed clear view of the area; and the arrangement of the three wide angle optics 72, 74, and 76 enables a 360° azimuth coverage of the air space surrounding protected aircraft 64.

Figure 6:
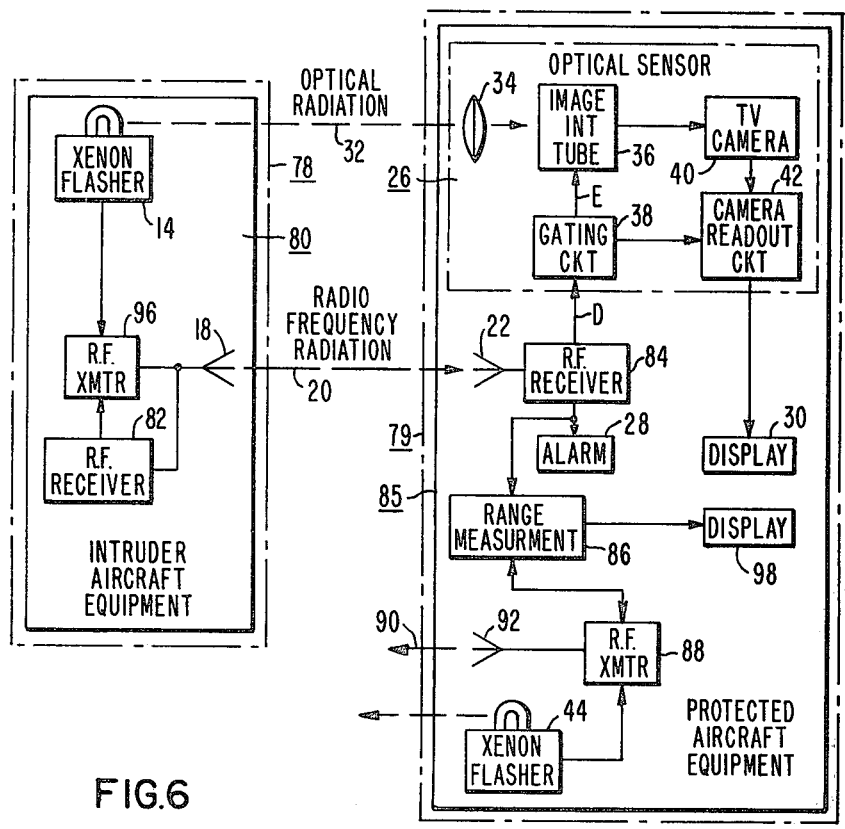
FIG. 6 is a schematic and block diagram of an alternate embodiment of the invention.

FIG. 6 shows an alternate embodiment of the invention wherein means are provided on the intruder aircraft 78 and protected aircraft 79 for making range measurements. Intruder aircraft equipment 80 includes xenon flasher 14, RF transmitter 96, RF receiver 82 and antenna 18. RF receiver 82 functions to receive RF signals from the protected aircraft 79 through antenna 18 and upon detection of an RF signal to cause RF transmitter 96 to generate a return signal through antenna 18.

The protected aircraft equipment 85 includes optical sensor 26, antennas 22 and 92, RF receiver 84, alarm 28, displays 30 and 98, xenon flasher 44, RF transmitter 88 and range measurement 86. RF receiver 84 is coupled to range measurement 86 which functions to measure lapse time between a transmitted RF pulse and a received RF pulse. Range measurement 86 is coupled to RF transmitter 88 which functions to send out an RF signal in response to a signal from range measurement 86. RF transmitter 96 further includes the functions of RF transmitter 16 shown in FIG. 1. RF receiver 84 further includes the functions of RF receiver 24 shown in FIG. 1. Blocks identified with the same reference characters in FIG. 1 as those in FIG. 6 have the same function and structure and operate in the same manner.

Figure 4:
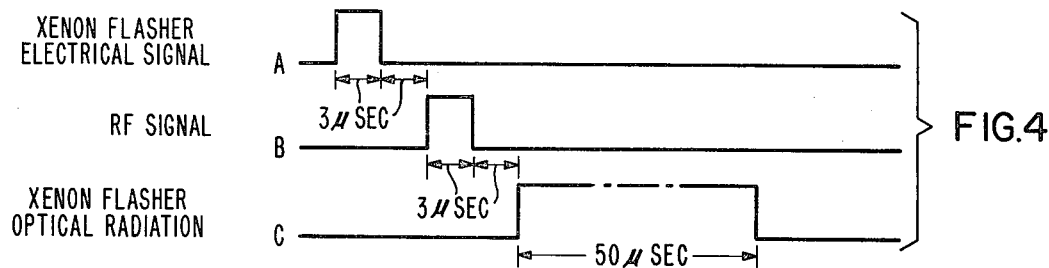
FIG. 4 shows typical waveforms of the embodiment of the invention on an intruder aircraft as shown in FIG. 1; and, FIG. 5 shows waveforms of an embodiment of the invention of a protected aircraft as shown in FIG. 1.

In operation intruder aircraft equipment 10 has xenon flasher 14 emit at the rate of approximately 30 per minute xenon flashes of optical radiation 32 in all directions for reception by protected aircraft in the area. Prior to the transmission of a xenon flash, RF transmitter 16 through antenna 18 emits an RF frequency pulse at about 400 megahertz and for a duration of approximately three microseconds as shown in FIG. 4 by signal A. The xenon flash may for example be 50 microseconds in duration and follow the RF signal by approximately three microseconds as shown in FIG. 4. Xenon flasher 14 sends a pulse to RF transmitter 16, signal A which may have a duration of three microseconds and precedes the RF pulse by about three microseconds.

Protected aircraft equipment 12 located on protected aircraft 8 receives radio frequency radiation 20 emanating from the intruder aircraft equipment 10 through antenna 22. The radiation 20 is detected in RF receiver 24 which sends a pulse to alarm 28 to initiate an alarm to alert a pilot or co-pilot and sends a pulse to optical sensor 26. Optical sensor 26 responds to the signal such as signal D shown in FIG. 5 by operating its sensor for 50 microseconds at the time that optical radiation 32 is expected to arrive at the protected aircraft which is three microseconds after the radio frequency radiation 20 arrives since both optical radiations 32 and radio frequency radiation 20 travel at the speed of light and will have the same transit time from the intruder aircraft equipment 10. Optical sensor 26 will provide an electrical output indicative of the optical radiation received and display in a proper format on display 30 so that a pilot may see the location and elevation of the intruder aircraft to be appraised of a possible collision course of the intruder aircraft with the protected aircraft.

Wide angle optics 34 passes the received radiation such as signal F as shown in FIG. 5, to an image intensifier tube 36 which is controlled by gating circuit 38 such as by signal E as shown in FIG. 5 to turn the image intensifier tube on for the 50 microsecond optical radiation signal 32. The output of the image intensifier tube is presented to a TV camera 40 which converts the optical information to electrical signals to camera readout circuitry 42 which in turn directs the electrical signals indicative of the received optical radiation 32 to display 30. A signal from gating circuitry 38 provides the proper time for the camera readout circuitry to operate.

Protected aircraft 8 may also carry a xenon flasher 44 and RF transmitter 46 which is coupled to antenna 48. Xenon flasher 44 emits optical radiation 50. Preceding the optical radiation 50 is RF radiation 52 from RF transmitter 46 and antenna 48. The xenon flasher and RF transmitter function to operate in a similar manner as intruder aircraft equipment 10 to warn other protected aircraft of its presence.

Referring to FIG. 6, the operation is similar to that of the embodiment of FIG. 1 except when radio frequency radiation 20 is received, RF receiver 84 sends a signal to range measurement 86 which causes RF transmitter 88 to emit RF radiation 90 through antenna 92. The intruder aircraft equipment 10 receives the RF radiation by antenna 18 and RF receiver 82. RF receiver 82 initiates RF transmitter 96 to send out a second RF pulse through antenna 18 which is received by the protected aircraft antenna 22 and RF receiver 84. RF receiver 84 couples the received RF radiation to range measurement 86 which measures the lapse time between the transmitted pulse 90 and the received radiation 20 due to the transmitted pulse 90 to provide an indication of range of the intruder aircraft 78. If the delay times through the circuitry is subtracted from the lapse time of the transmitted pulse 90 and the received RF pulse 20 and this time is divided in half, the remaining time is indicative of the range of the intruder aircraft where the time multiplied by the speed of light will provide the range measurement.

An aircraft proximity warning indicator is provided wherein an intruder aircraft emits an RF pulse and a xenon flash in sequence. The RF pulse is to alert a second aircraft or protected aircraft of an impending xenon flash from the intruder aircraft which provides position information. The RF pulse received from the intruder aircraft opens a gate on an image tube of the protected aircraft to record an image of the surrounding air space. The sensed optical radiation is displayed in a format where an individual may observe the display to see if a collision is probable between the protected aircraft and the intruder aircraft.

I claim as my invention:

1. A method for a first aircraft to provide proximity warning to a second aircraft comprising the steps of:
   generating and transmitting by said first aircraft a radio frequency signal indicative that an optical radiation pulse is about to occur;
   generating an optical radiation pulse later in time by a predetermined amount than said radio frequency signal by said first aircraft;
   receiving said radio frequency signal by said second aircraft;
   sensing said optical radiation pulse during a predetermined amount of time after receiving said radio frequency signal by said second aircraft;
   displaying said sensed optical radiation pulse by said second aircraft;
   generating and transmitting a second signal by said second aircraft;
   receiving said second signal by said first aircraft;
   transmitting a third signal by said first aircraft;
   receiving said third signal by said second aircraft;
   measuring the elapsed time from the transmission of said second signal to the reception of said third signal; and
   converting said elapsed time into an indication of range between said first aircraft and second aircraft.

2. Apparatus for a first and second aircraft to provide proximity warning to said second aircraft comprising:
   means for generating and transmitting a radio frequency signal by said first aircraft;
   means for generating an optical radiation pulse later in time by a predetermined amount than said radio frequency signal by said first aircraft;
   means for receiving said radio frequency signal by said second aircraft;
   means for sensing said optical radiation pulse during a predetermined amount of time after receiving said radio frequency signal by said second aircraft;
   means for displaying said sensed optical radiation pulse by said second aircraft;
   means for generating and transmitting a second signal by said second aircraft;
   receiving said second signal by said first aircraft;
   transmitting a third signal by said first aircraft;
   receiving said third signal by said second aircraft;
   measuring the elapsed time from the transmission of said second signal to the reception of said third signal; and
   means for converting said elapsed time into an indication of range between said first aircraft and second aircraft.

* * * * *